United States Patent Office 3,753,972
Patented Aug. 21, 1973

3,753,972
FRACTIONATION OF AGAR
Wilfred Yaphe, and Michael Duckworth, Montreal, Quebec, Canada, assignors to Research Corporation, New York, N.Y.
No Drawing. Filed Apr. 28, 1970, Ser. No. 32,777
Int. Cl. C07c 47/18
U.S. Cl. 260—209 R                14 Claims

ABSTRACT OF THE DISCLOSURE

It has been determined that agar is a complex mixture of polysaccharides all with the same backbone of linkages but masked to a variable degree with charged groups. There are three extremes of structure in this spectrum of polysaccharides (1) completely neutral agarose, which is defined as a neutral, linear polymer with agarobiose as the repeating unit (2) pyruvated agarose in which masking of agarobiose units with charged groups gradually increases, the D-galactose being substituted by a 4,6-carboxyethylidene-D-galactose and the 3,6-anhydro-L-galactose residues with galactose sulfate (3) sulfated galactan in which the substitution on the D-galactose units with pyruvate decreases and the concentration of L-galactose sulfate increases, yielding a non-gelling, sulfated polymer with no 3,6-anhydro-L-galactose.

Practically agarose is defined as that fraction of the complex of molecules in agar, with the lowest charge content and therefore greatest gelling ability. A highly purified agarose evidencing no detectable pyruvate and not more than 0.05% sulfate is prepared at yields of about 10–20% by fractionating purified agar. In the fractionation operations the agar is washed at room temperature to remove a non-gelling sulfated galactan. The agar is again washed at 50° C. to remove a charged component having very low gel strength. The washed agar may then be further purified by treatment with polyethylene glycol. The gelling components in the washed agar or the polyethylene precipitated agar are chromatographically fractionated, such as by DEAE Sephadex A-50, at a temperature of about 60° C. to recover a substantially pure agarose fraction and charged gelling components similar in structure to agarose.

---

This invention relates to the purification of agar. More particularly, this invention relates to the fractionation of the gelling components in agar and recovery of neutral and charged gelling components therefrom. Still more particularly, this invention is directed to the recovery from agar of a substantially pure agarose fraction and charged gelling components similar in structure to agarose with varying content of pyruvate and sulfate as principal charged units. Agarose is defined as that fraction of the complex of molecules in agar with the lowest charge content and therefore greatest gelling ability.

In accordance with one embodiment of this invention there is provided a substantially pure agarose or fraction derived from agar.

In accordance with another embodiment of this invention there is provided a method for the recovery from agar of a substantially pure neutral agarose fraction having substantially no detectable pyruvate and having a sulfate content of substantially less than about 0.10% by weight, such as an amount below about 0.05% by weight, more or less.

In accordance with still another embodiment of this invention there is provided a method for the recovery from agar of charged gelling components similar in structure to agarose but varying in gel strength and content of pyruvate and sulfate.

Various techniques are known for the fractionation of agar and for the recovery of various components thereof, such as agarose and agaropectin, see particularly U.S. Pats. 3,335,127 (1967) and 3,423,396 (1969) and Clinical Chemistry, vol. 15, No. 10, pages 1002–1005 (1969). The disclosures of these publications are herein incorporated and made part of this disclosure. For the most part, however, the techniques and methods available heretofore have not been completely satisfactory, particularly with respect to the preparation and recovery from agar of an agarose fraction or material which is substantially pure neutral agarose having no detectable pyruvate and having a sulfate content of below about 0.10% by weight, especially not more than about 0.05% by weight.

Accordingly, it is an object of this invention to provide a process for the fractionation of agar for the recovery therefrom of a substantially pure neutral agarose fraction having no detectable pyruvate and having a sulfate content of not more than about 0.05% by weight.

Another object of this invention is to provide a process for the fractionation of agar and the recovery therefrom of charged gelling components, similar in structure to agarose, but varying in gel strength and charge content.

How these and other objects of this invention are achieved will become apparent in the light of the accompanying disclosure.

In accordance with this invention there is provided a process for the recovery from agar of a substantially pure agarose material or fraction having substantially no pyruvate and having a sulfate content below about 0.10% by weight, such as not more than about 0.05% by weight. In accordance with the practices of this invention the above-referred substantially pure agarose fraction or material is obtained by subjecting agar to a washing operation, such as a plurality of washing operations, e.g. two washing operations, such as by means of column chromatography, one of the washing operations being carried out at a temperature substantially below the temperature at which another washing operation is carried out. The resulting washed agar may then either be fractionated on DEAE Sephadex A-50 or further purified such as by precipitation from aqueous solution by means of a high molecular weight polyethylene glycol, such as a polyethylene glycol having a molecular weight in the range 600–20,000, such as the above about 2000, preferably about 6000. The washed agar, or the agar precipitated with polyethylene glycol is then fractionated by chromatographic fractionation by passing the agar in an aqueous solution thereof through a chromatographic column, such as a column containing an ion exchanger, such as an anionic ion exchanger whose pores are large enough to admit molecules having a molecular weight of about 25,000, such as a cross-linked dextran, e.g. diethylaminoethyl dextran (DEAE Sephadex A–50 manufactured by Pharmacia, Uppsala, Sweden); see U.S. Pat. 3,042,667 (1962).

By following the above procedure there is obtainable from agar a substantially pure agarose fraction in substantial yields, about 10–20% by weight based on the agar, agarose being defined as a linear polymer with agarobiose as the repeating unit. The substantially pure agarose material obtainable in accordance with the practice of this invention has substantially no detectable pyruvate and has a sulfate content below about 0.10% by weight, not more than about 0.05% by weight, more or less.

In the plural stage washing operation, such as a two stage washing operation, in the initial fractionation step in accordance with this invention, the first washing operation is conveniently carried out at about room temperature, such as a temperature in the range 15–25° C., more or less. The next or another washing operation is conveniently carried out at a higher temperature, about 30–50° C. higher than the first washing operation, such as a temperature in the range of 50–80° C., e.g. about 60° C.

In these washing operations a suspension of powdered agar in 0.01–0.1 M aqueous sodium chloride is added to a jacketed chromatographic column. The agar suspension therein is then washed with a dilute aqueous sodium chloride solution at about room temperature to remove the yellow pigment, the substantially soluble components and the non-gelling sulfated polysaccharide complexes. For example, washing the agar at room temperature serves to remove a non-gelling sulfated galactan. The materials so removed analyzed about 7.0% by weight sulfate, 0.55% by weight pyruvate and 5.3% by weight 3,6-anhydrogalactose.

Hot water is then circulated through a jacketed chromatographic column to bring the temperature of the agar therein up to about 50–70° C. The agar is then again washed or eluted with aqueous sodium chloride solution at that temperature until the eluant was free of cetylpyridinium chloride precipitable material and carbohydrate. This second washing operation serves to remove components with a very low gel strength and these components analyzed 4.1% by weight sulfate, 1.3% by weight pyruvate and 19.4% by weight 3,6-anhydrogalactose. The washed agar in the column is then dissolved therefrom by distilled water at a temperature of about 100° C. and the resulting solution filtered.

Following the washing operation the agar may be further fractionated by forming an aqueous solution thereof in 0.1 M NaCl together with a polyethylene glycol, such as a polyethylene glycol having a molecular weight in the range 600 to 20,000, more or less, preferably in the range 4000–8000, e.g. 6000. This fractionation operation employing polyethylene glycol is desirably carried out at a temperature in the range from about 45° C. to about 100° C., more or less, such as a temperature in the range 60–80° C. The polyethylene glycol fractionation operation serves to precipitate the gelling polysaccharide components of the agar which separate out or are precipitated as a fine flocculent material which is conveniently recovered by filtration or centrifugation from the hot solution. The resulting precipitated agarose-enriched material, recovered at a substantial yield upwards of about 25–30% by weight based on the agar contains about 0.65% by weight sulfate, 0.05% by weight pyruvate and about 45% by weight 3,6-anhydrogalactose. Following the purification of the crude agar and the fractionation of the washed agar and recovery of an agarose-enriched fraction, these purified preparations are then subject to further purification by chromatography, such as by passing a solution of these purified agars through a column containing a material, such as an anionic ion exchanger or a cross-linked dextran having pores in the lattice sufficiently large enough to admit the relatively large agar molecules. Suitable such materials are readily available and include the polyethylaminoethyl celluloses, e.g. diethylaminoethyl cellulose, as well as the polyacrylamides and the cross-linked dextrans, such as the DEAE Sephadex manufactured by Pharmacia, Uppsala, Sweden. In general, hydrophilic loose lattice materials are suitable for use in this fractionation operation in accordance with this invention. This fractionation operation which might be termed a gel filtraton operation or an exclusion chromatography or ion exchange chromatography is carried out at an elevated temperature, such as a temperature in the range 45–100° C., such as a temperature in the range 50–80° C., e.g. 60° C.

By carrying out the fractionation of agar in the manner described hereinabove in accordance with this invention it has been determined that agar consists of a spectrum of polysaccharides with three extremes, viz. completely neutral agarose, pyruvated agarose and a sulfated polymer with no 3,6-anhydrogalactose. The spectrum consists of a complex mixture of polysaccharides containing varying concentrations of pyruvate and sulfate, the neutral agarose being present only in a small concentration. The overall combination of fractionation procedures in accordance with this invention results in the recovery of substantially pure agarose and gelling components similar in structure to agarose.

In the determination of the sulfate value a sensitive test was employed. The sulfate test employed is the method of A. S. Jones and D. S. Lethem as reported in Chem. & Ind. (1954) 662. The pyruvate or pyruvic analysis employed is based on the method of A. G. Hadjivassiliou and S. V. Reider, Clin. Chem. Acta. 19 (1968), 357. This analysis is carried out by hydrolyzing polysaccharide (3–5 mg.) at 100° C. for 4 hours with oxalic acid (3 mls. of 0.04 N). The hydrolysate is cooled and neutralized with calcium carbonate, centrifuged and the supernatant made up to 10 mls. with distilled water. To 2 mls. of this solution in a square quartz cuvette with a 1 cm. light path is mixed 1 ml. of triethanolamine (1 M), NADH solution (0.05 ml. of a 1% solution in 0.1% $NaHCO_3$) is added and the absorbance measured at 340 nm. Lactate dehydrogenase (0.01 ml.) is added and the absorbance noted every minute until a constant value is obtained. The percentage of pyruvic acid is obtained from the equation:

Percent Pyruvic Acid $$= \frac{5 \times 88 \times (A\ initial \times 3.05 - A\ Final \times 3.06) \times 100}{W \times 6.22 \times 1000}$$

W = wt. of polysaccharide in mg.
A initial = initial absorbance
A fiinal = final absorbance It is interesting to note that this definitive method for determining pyruvate indicates the presence of pyruvated agarose in all commercial samples of agarose which were tested.

It is important in the practice of this invention and in the control thereof to use sensitive methods to assay for sulfate and pyruvate, such as the methods identified hereinabove, in order to evaluate the number of charge groups in purified agars and agaroses. These test procedures make it evident that commercial preparations of agarose known heretofore are not neutral molecules devoid of all charge groups. Rather, these test porcedures have shown that some commercial agarose materials contain equal amounts of two gelling components, one essentially neutral and the other containing pyruvate and sulfate as charge groups. The above-described final fractionation operation carried out on the purified agars yields the preferred substantially pure, highly purified agarose in accordance with this invention and charged agarose which may be considered to be the gelling component in agaropectin. These charged agarose fractions, however, appear to have a number of biological uses. The following is illustrative of the practices of this invention:

PREPARATION OF AGAROSE FROM COMMERCIAL AGAR

Powdered agar (100 g. Difco Bacto agar) was suspended in 1500 ml. of sodium chloride (0.05 M) in a jacketed chromatography column. The agar was washed for 3 to 4 hours with sodium chloride (0.05 M) at room temperature to remove the yellow pigment, soluble components and a non-gelling sulfated polysaccharide complex. Hot water was circulated through the jacket and the agar was washed with saline at 50° to 60° C. until the eluant was free of cetylpyridinium chloride precipitable material and carbohydrate. The washing at 50° C. removes a viscous polysaccharide with a relatively high sulfate and pyruvate content.

The washed agar was dissolved at 100° C. and passed through a coarse glass sinter filter to remove debris. The agar was either recovered by ethanol precipitation or used immediately for the preparation of agarose.

|  | Percent | | |
| --- | --- | --- | --- |
|  | Yield | SO₄ | Pyruvic acid |
| Agar | 100 | 2.95 | 0.9 |
| Washed agar | 60 | 0.96 | 0.2 |

To the solution of washed agar (2000 ml.) at 60° to 80° C., prepared as described hereinabove, were added 50 ml. of sodium chloride (2 M) and 600 grams of polyethylene glycol having a molecular weight of about 6,000. The gelling components of the agar settled as a fine flocculent precipitate and were recovered by centrifugation of the hot solution. The precipitate was washed twice with a hot solution of 25% polyethylene glycol dissolved in sodium chloride (0.1 M). The precipitate was then washed with sodium chloride (0.1 M) until free of polyethylene glycol as determined by iodine test wherein one ml. of test solution is added to one ml. of potassium iodide iodine solution. Trace amounts of polyethylene glycol in the test solution turn the iodine solution dark brown.

The precipitate was dehydrated by treatment with 70%, 90% and 100% ethanol. This fraction, generally considered to be the agarose component of agar, was obtained at a yield of 31% and analyzed 0.65% sulfate and 0.05% pyruvate.

Thirty grams of the washed agar or the polyethylene glycol precipitate were dissolved in 1500 ml. of distilled water and added to 1000 ml. of DEAE Sephadex (Cl⁻) A–50 in a chromatography column at 60° C. The Sephadex was washed with water until the eluant was free of carbohydrate and then eluted with aqueous sodium chloride, such as 0.05 M–2.5 M NaCl, e.g. 1.5 M sodium chloride. Two gelling components were obtained, Fraction No. 1, an essentially neutral polysacchardie which was eluted with distilled water, and Fraction No. 2, a charged polysaccharide which was eluted with sodium chloride (1.5 M). The neutral polysaccharide as precipitated in 3 volumes of ethanol and dehydrated with 70%, 90% and 100% ethanol. The charged polysaccharide was dialysed against hot water, precipitated and dehydrated with ethanol.

The essentially neutral polysaccharide fraction, Fraction No. 1, with a low concentration of sulfate and no detectable pyruvic acid is agarose. The other fraction, Fraction No. 2, with good gelling properties is similar in chemical structure to agarose but has a high concentration of charged groups.

|  | Percent | | |
| --- | --- | --- | --- |
|  | Yield¹ | SO₄ | Pyruvic acid |
| Neutral agarose Fraction No. 1 | 10 | 0.05 | (²) |
| Charged agarose Fraction No. 2 | 14 | 0.95 | 0.80 |

¹ Calculated as dry wt. of initial polysaccharide.
² Not detectable.

In the practice of this invention for the recovery of the essentially neutral, substantially pure agarose material the DEAE Sephadex was converted into chloride form by treatment with sodium hydroxide and hydrochloric acid and the DEAE Sephadex used to fractionate the polyethylene glycol-precipitated agrose was reactivated by washing with distilled water.

Highly purified agarose can be prepared in accordance with the practices of this invention from agar of various sources. For example, highly purified agarose can be prepared from *Gelidium cartilagineum* (U.S.A.), *Gelidium sesquipedale* (Spanish agar), Pterocladia (New Zealand agar), Ahnfeltia (Russian agar) and from other agarophytes.

The highly purified agaroses prepared in accordance with this invention are characterized by an extremely low sulfate content, e.g. below about 0.05% by weight and with no detectable pyruvate. These highly purified agaroses are obtainable from crude agars which usually contain about 2–4% by weight sulfate and about 0.3% by weight pyruvate. When these crude agars are washed the resulting washed agars usually contain 1–1.5% by weight sulfate and about 0.15% by weight pyruvate. Commercial agaroses are characterized by a sulfate content in the range 0.4–0.6% by weight and a pyruvate content of about 0.05%.

Although it is generally preferred in the practices of this invention to include an intermediate purification or fractionation step following the washing of the crude agar to produce a purified agar prior to the preparation therefrom of the very low, below about 0.05% sulfate agarose produced in accordance with this invention, if desired, the intermediate purification or fractionation operation, e.g. the polyethylene glycol agarose precipitation step, can be omitted. If this intermediate fractionation or purification step is included, other fractionation or precipitation techniques may be substituted in place of polyethylene glycol precipitation, such as removal of the charged polysaccharide in the purified washed agar by means of quaternary ammonium salts, ion exchangers, bentonite or aluminum hydroxide gel. These substituted procedures yield the usual commercial agarose products which are contaminated with low concentrations of agaropectin. Several refractionations may reduce the yield and sulfate content of these products but do not yield a substantially sulfate-free agarose as is obtained by the practices of this invention.

As will be apparent to those skilled in the art in the light of the accompanying disclosure, many modifications, alterations and substitutions are possible in the practice of this invention without departing from the spirit or scope thereof.

We claim:

1. A method of fractionating agar to recover therefrom a substantially pure neutral agarose having substantially no detectable pyruvate and having a sulfate content of not more than about 0.05% by weight which comprises subjecting agar to plural dilute aqueous saline washing operations including a first washing operation and a second washing operation, said first washing operation being carried out at about room temperature and said second washing operation being carried out at a temperature of 30–50° C. higher than said first washing operation, forming an aqueous solution of the resulting washed agar, fractionating the resulting washed agar solution by mixing therewith a polyethylene glycol to precipitate an agarose fraction, forming an aqueous solution of said agarose fraction, fractionating the resulting agarose solution by chromatography and recovering therefrom as product the aforesaid substantially pure neutral agarose.

2. A method in accordance with claim 1 wherein the chromatographic fractionation of said resulting agarose solution is carried out by gel filtration or exclusion chromatography.

3. A method in accordance with claim 1 wherein the chromatographic fractionation of said resulting agrose solution is carried out by ion-exchange chromatography.

4. A method in accordance with claim 1 wherein said first and second washing operations are carried out at a temperature of 15–25° C. and at a temperature in the range 50–80° C., respectively.

5. A method in accordance with claim 1 wherein the polyethylene glycol employed to precipitate the agarose fraction from solution has a molecular weight in the range from about 4000 to about 8000.

6. A method in accordance with claim 1 wherein said agarose fraction is precipitated from solution by means of a polyethylene glycol at a temperature in the range 60–100° C.

7. A method in accordance with claim 1 wherein the chromatographic fractionation of said agarose solution is carried out by contacting the agarose solution with a cross-linked dextran gel.

8. A method in accordance with claim 1 wherein the chromatographic fractionation of said agarose solution is carried out by contacting the solution with a cross-linked dextran gel at a temperature in the range 50–90° C.

9. A method in accordance with claim 1 wherein the chromatographic fractionation of said agarose solution is carried out by contacting said solution with a diethylaminoethyl modified cross-linked dextran.

10. A method in accordance with claim 1 wherein the chromatographic fractionation operation is carried out by contacting the agarose solution with an anionic ion-exchanger whose pores are large enough to admit molecules having a molecular weight above about 25,000.

11. A method in accordance with claim 10 wherein said anionic ion exchanger is a diethylaminoethyl cross-linked dextran.

12. A method in accordance with claim 10 wherein said anionic ion exchanger is selected from the group consisting of polyacrylamides, dextrans, macroreticular resins and organic modified celluloses.

13. A method of fractionating agar to recover therefrom a substantially pure neutral agarose having substantially no detectable pyruvate and having a sulfate content of not more than about 0.05% by weight which comprises subjecting agar to plural dilute aqueous saline washing operations including a first washing operation and a second washing operation, said first washing operation being carried out at a temperature in the range 15–25° C. and said second washing operation being carried out at a temperature in the range from about 50° C. to about 80° C., forming an aqueous solution of the resulting washed agar, subjecting the resulting aqueous agar solution to a chromatographic fractionation operation and recovering therefrom the aforesaid substantially pure neutral agarose.

14. Substantially pure neutral agarose material having substantially no detectable pyruvate and having a sulfate content of not more than about 0.05% by weight.

References Cited
UNITED STATES PATENTS

| | | | |
|---|---|---|---|
| 3,281,409 | 10/1966 | Blethen | 260—209 R |
| 3,335,127 | 8/1967 | Polson | 260—209 R |
| 3,423,396 | 1/1969 | Zabin | 260—209 R |
| 3,527,712 | 9/1970 | Renn et al. | 260—209 R |

LEWIS GOTTS, Primary Examiner

J. R. BROWN, Assistant Examiner

U.S. Cl. X.R.

252—316